(12) United States Patent
Bakulin et al.

(10) Patent No.: US 12,339,411 B2
(45) Date of Patent: Jun. 24, 2025

(54) ENHANCEMENT OF SINGLE SENSOR SEISMIC DATA

(71) Applicants: Saudi Arabian Oil Company, Dhahran (SA); Trofimuk Institute of Petroleum Geology and Geophysics, Novosibirsk (RU)

(72) Inventors: Andrey Bakulin, Dhahran (SA); Ilya Silvestrov, Dhahran (SA); Dmitry Neklyudov, Novosibirsk (RU); Maxim Protasov, Berdsk (RU); Kirill Gadylshin, Novosibirsk (RU)

(73) Assignees: Saudi Arabian Oil Company, Dhahran (SA); Trofimuk Institute of Petroleum Geology and Geophysics, Novosibirsk (RU)

( * ) Notice: Subject to any disclaimer, the term of this patent is extended or adjusted under 35 U.S.C. 154(b) by 153 days.

(21) Appl. No.: 18/043,648

(22) PCT Filed: Sep. 7, 2020

(86) PCT No.: PCT/RU2020/000469
§ 371 (c)(1),
(2) Date: Mar. 1, 2023

(87) PCT Pub. No.: WO2022/050861
PCT Pub. Date: Mar. 10, 2022

(65) Prior Publication Data
US 2023/0266492 A1    Aug. 24, 2023

(51) Int. Cl.
*G01V 1/30* (2006.01)

(52) U.S. Cl.
CPC ...................... *G01V 1/30* (2013.01)

(58) Field of Classification Search
None
See application file for complete search history.

(56) References Cited

U.S. PATENT DOCUMENTS

| | | | |
|---|---|---|---|
| 3,597,727 | A | 8/1971 | Judson et al. |
| 3,806,863 | A | 4/1974 | Brown et al. |
| (Continued) | | | |

FOREIGN PATENT DOCUMENTS

| | | |
|---|---|---|
| CN | 102109612 | 6/2011 |
| CN | 102478671 | 5/2012 |
| (Continued) | | |

OTHER PUBLICATIONS

Alsteris et al., "Short-time phase spectrum in speech processing: A review and some experimental results," Digital Signal Processing, 2007, 17:578-616, 39 pages.

(Continued)

*Primary Examiner* — Walter L Lindsay, Jr.
*Assistant Examiner* — Geoffrey T Evans
(74) *Attorney, Agent, or Firm* — Fish & Richardson P.C.

(57) ABSTRACT

Disclosed are methods, systems, and computer-readable medium to perform operations including: receiving prestack single sensor seismic data; representing traveltime moveout of the prestack single sensor seismic data locally as a second-order curve; calculating, using the prestack single sensor seismic data, local kinematic parameters that define the second-order curve; and performing, based in part on the local kinematic parameters, wavefield transformation on the single sensor seismic data to generate enhanced prestack single sensor seismic data.

14 Claims, 10 Drawing Sheets

(56) References Cited

U.S. PATENT DOCUMENTS

| | | | |
|---|---|---|---|
| 5,850,622 | A | 12/1998 | Vassiliou et al. |
| 6,161,076 | A | 12/2000 | Barr et al. |
| 6,876,599 | B1 | 4/2005 | Combee |
| 7,379,386 | B2 | 5/2008 | Muyzert et al. |
| 10,947,789 | B1 | 3/2021 | Al-Abdulrahman et al. |
| 2003/0055567 | A1 | 3/2003 | Kelly |
| 2004/0233782 | A1 | 11/2004 | Herkenhoff et al. |
| 2005/0075790 | A1 | 4/2005 | Taner |
| 2005/0090989 | A1 | 4/2005 | Kelly |
| 2007/0055465 | A1 | 3/2007 | Lecerf et al. |
| 2008/0049551 | A1 | 2/2008 | Muyzert et al. |
| 2009/0276159 | A1 | 11/2009 | Strobbia |
| 2010/0027376 | A1 | 2/2010 | Washbourne et al. |
| 2011/0013481 | A1 | 1/2011 | Clark |
| 2017/0269246 | A1 | 9/2017 | Anderson et al. |
| 2020/0264327 | A1 | 8/2020 | Gadylshin et al. |
| 2020/0400847 | A1 | 12/2020 | Bakulin et al. |
| 2022/0260740 | A1 | 8/2022 | Bakulin et al. |
| 2022/0260742 | A1 | 8/2022 | Bakulin et al. |
| 2022/0268957 | A1 | 8/2022 | Bakulin et al. |

FOREIGN PATENT DOCUMENTS

| | | |
|---|---|---|
| CN | 102854530 | 1/2013 |
| CN | 105388519 | 3/2016 |
| CN | 106443787 | 2/2017 |
| CN | 106646613 | 5/2017 |
| CN | 106842297 | 6/2017 |
| EP | 2762926 | 8/2014 |
| WO | WO 2005017564 | 2/2005 |
| WO | WO 2011034870 | 3/2011 |
| WO | WO 2013190512 | 12/2013 |
| WO | WO 2019156586 | 8/2019 |
| WO | WO 2021020982 | 2/2021 |
| WO | WO 2021020983 | 2/2021 |
| WO | WO 2021020984 | 2/2021 |

OTHER PUBLICATIONS

Bakulin et al., "3D Prestack Land Data Enhancement Based On Nonlinear Beamforming in Cross-Spread Domain," EAGE 81st Annual Conference and Exhibition, Jun. 6, 2019, 5 pages.

Bakulin et al., "Application of supergrouping to enhance 3D prestack seismic data from a desert environment," The Leading Edge, Mar. 1, 2018, 37(3):306-313, 8 pages.

Bakulin et al., "Application of supergrouping to land seismic data in desert environment," SEG International Exposition and 86th Annual Meeting, 2016, 4649-4653, 5 pages.

Bakulin et al., "Bootstrapping invisible signals: prestack land data enhancement using nonlinear beamforming with local waveform corrections," SEG Expanded Abstracts, 2019, 3954-3958, 5 pages.

Bakulin et al., "Enhance—Estimate—Image: new processing approach for single-sensor and other seismic data with low pre-stack signal-to-noise ratio," SEG Technical Program Expanded Abstracts, Aug. 17, 2017, 5 pages.

Bakulin et al., "Nonlinear beamforming for enhancement of 3D prestack land seismic data," Geophysics, May 2020, 85(3): V283-V296, 14 pages.

Bakulin et al., "Nonlinear beamforming for enhancing pre-stack data with challenging near surface or overburden," SEG Technical Program Expanded Abstracts, Aug. 2017, 5 pages.

Bakulin et al., "Nonlinear beamforming for enhancing prestack seismic data with a challenging near surface or overburden," Data Processing & Machine Learning, Dec. 2018, 36:121-126, 6 pages.

Bakulin et al., "Prestack data enhancement with phase corrections in time-frequency domain guided by local multidimensional stacking," Geophysical Prospecting, May 15, 2020, 68(6):1811-1818, 8 pages.

Baykulov et al., "Prestack seismic data enhancement with partial common-reflection-surface (CRS) stack," Geophysics, May-Jun. 2009, 74(3):V49-V58, 10 pages.

Berkovitch et al., "How non-hyperbolic MultiFocusing improves depth imaging," First Break, Sep. 2011, 29:95-103, 9 pages.

Buzlukov et al., "Imaging improvement by prestack signal enhancement," Geophysical Prospecting, Jun. 10, 2013, 61:1150-1158, 9 pages.

Buzlukov et al., "Prestack data enhancement using local traveltime approximation," 72nd EAGE Conference & Exhibition incorporating EUROPEC, Barcelona, Spain, Jun. 14-17, 2010, 5 pages.

Curia et al., "The impact of multifocusing in the processing of land 3D seismic data in a fold and thrust belt setting: Ranquil Norte Block, Neuquen Basin, Argentina," The Leading Edge, Sep. 2017, 36(9):770-774, 5 pages.

Digital Signal Processing, Blackledge, Horwood Publishing, 2006, 2nd ed., 840 pages.

Erdogan et al., "Phase-sensitive and recognition-boosted speech separation using deep recurrent neural networks," IEEE International Conference on Acoustics, Speech, and Signal Processing, Apr. 19, 2015, 708-712, 5 pages.

Gadylshin et al., "Inpainting of local wavefront attributes using artificial intelligence," SEG Technical Program Expanded Abstracts, Aug. 1, 2019, 2212-2216, 5 pages.

Hoecht et al., "Operator-oriented CRS interpolation," Geophysical Prospecting, 2009, 57:957-979, 23 pages.

Khaidukov et al., "Enhancement of seismic data gathered by floating ice acquisition: application of local kinematic attributes," SEG International Exposition and 86th Annual Meeting, 2016, 4654-4658, 5 pages.

Li et al., "A low rank approximation method for ice-break noise attenuation of simultaneous vibroseis data," SEG Technical Program Expanded Abstracts, Aug. 2017, 5 pages.

Liang et al., "The optimal ratio time-frequency mask for speech separation in terms of the signal-to-noise ratio," The Journal of the Acoustical Society of America, Oct. 16, 2013, 134(5):EL452-EL458, 8 pages.

Lichman et al., "Automated Phase-based Moveout Correction," 69th SEG Annual International Meeting, Expanded Abstracts, 2000, 4 pages.

Lichman et al., "Phase Inversion Deconvolution for Surface Consistent Processing and Multiple Attenuation," SEG Annual International Meeting, Expanded Abstracts, 1999, 4 pages.

Martin et al., "Noise Power Spectral Density Estimation Based on Optimal Smoothing and Minimum Statistics," IEEE Transactions on Speech and Audio Processing, Jul. 2001, 9(5):504-512, 9 pages.

Mosher et al., "Generalized windowed transforms for seismic processing and imaging," SEG Las Vegas 2012 Annual Meeting, Oct. 25, 2012, 5 pages.

Mueller et al., "Improving Prestack Migration with CRS Techniques—A Case Study," 72nd EAGE Conference and Exhibition incorporating SPE EUROPEC 2010, Expanded Abstract, Jun. 14-17, 2010, 5 pages.

Neklyudov et al., "Intra-array statics and phase corrections obtained by beamforming in the Short-Time Fourier Transform domain: Application to supergrouping," SEG International Exposition, 2017, 4991-4995, 5 pages.

Özbek et al., "3-D filter design on a hexagonal grid with applications to point-receiver land acquisition," SEG Int'l Exposition and 74th Annual Meeting, Oct. 10-15, 2004, 5 pages.

PCT International Search Report and Written Opinion in International Appln. No. PCT/RU2018/000079, dated Dec. 6, 2018, 15 pages.

PCT International Search Report and Written Opinion in International Appln. No. PCT/RU2019/000532, dated Apr. 3, 2020, 10 pages.

PCT International Search Report and Written Opinion in International Appln. No. PCT/RU2019/000534, dated Apr. 3, 2020, 17 pages.

PCT International Search Report and Written Opinion in International Appln. No. PCT/RU2019/000533, dated Apr. 8, 2020, 13 pages.

PCT International Search Report and Written Opinion in International Appln. No. PCT/RU2020/000469, dated May 28, 2021, 18 pages.

(56) References Cited

OTHER PUBLICATIONS

Robinson et al., "Geophysical signal analysis," Society of Exploration Geophysicists, 2000, 481 pages.
RU Office Action in Russian Appln. No. 2022103676, dated Jan. 18, 2023, 10 pages, with English Translation.
RU Office Action in Russian Appln. No. 2022104308, dated Jan. 12, 2023, 11 pages, with English Translation.
RU Office Action in Russian Appln. No. 2022104454, dated Jan. 16, 2023, 10 pages, with English Translation.
RU Office Action in Russian Appln. No. 2023106594, dated Nov. 30, 2023, 17 pages, with English Translation.
SAIP Examination Report in SAIP Appln. No. 522431566, dated Dec. 27, 2023, 15 pages.
Ulrych et al., "The essence of phase in seismic data processing and inversion," 77th SEG Annual Meeting, Expanded Abstracts, 2007, 1765-1769, 5 pages.
Wang et al., "Time-frequency masking for speech separation and its potential for hearing aid design," Trends in Amplification, Dec. 2008, 12(4):332-353, 22 pages.
Wikipedia.com [online], "Median filter," Last edited on Sep. 10, 2021, retrieved on Apr. 8, 2022, retrieved from URL <https://en.wikipedia.org/wiki/Median_filter>, 4 pages.
Williamson et al., "Time-Frequency Masking in the Complex Domain for Speech Dereverberation and Denoising," IEEE/ACM Transactions on Audio, Speech and Language Processing, May 2016, 13(9):1-10, 10 pages.
Yilmaz et al., "Blind separation of speech mixtures via time-frequency masking," IEEE Trans. Signal Process, Jul. 2004, 52(7):1830-1847, 19 pages.
Zhang et al., "Common-reflection-surface (CRS) stack for common offset," Geophysical Prospecting, 2001, 49:709-718, 10 pages.

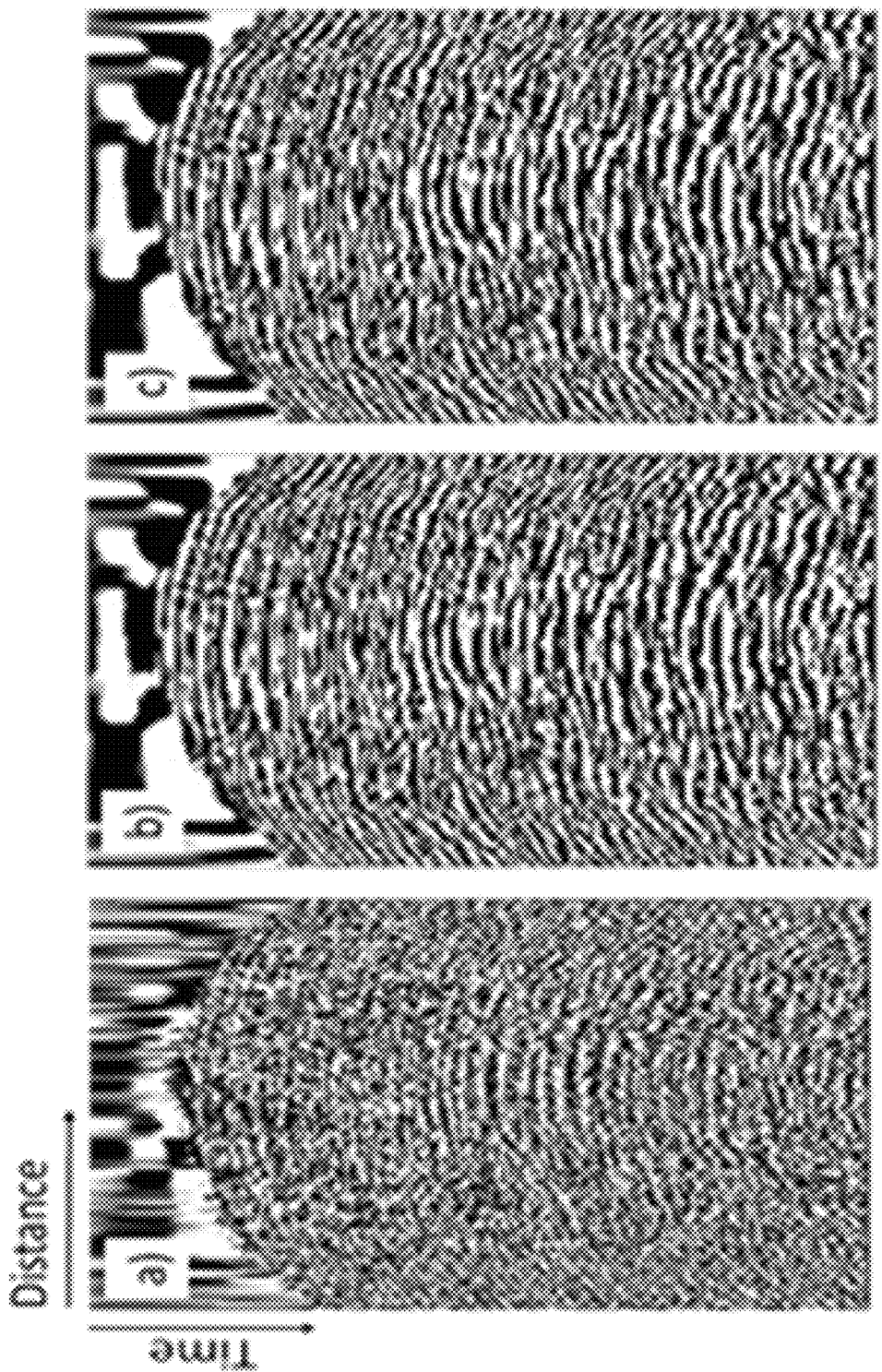

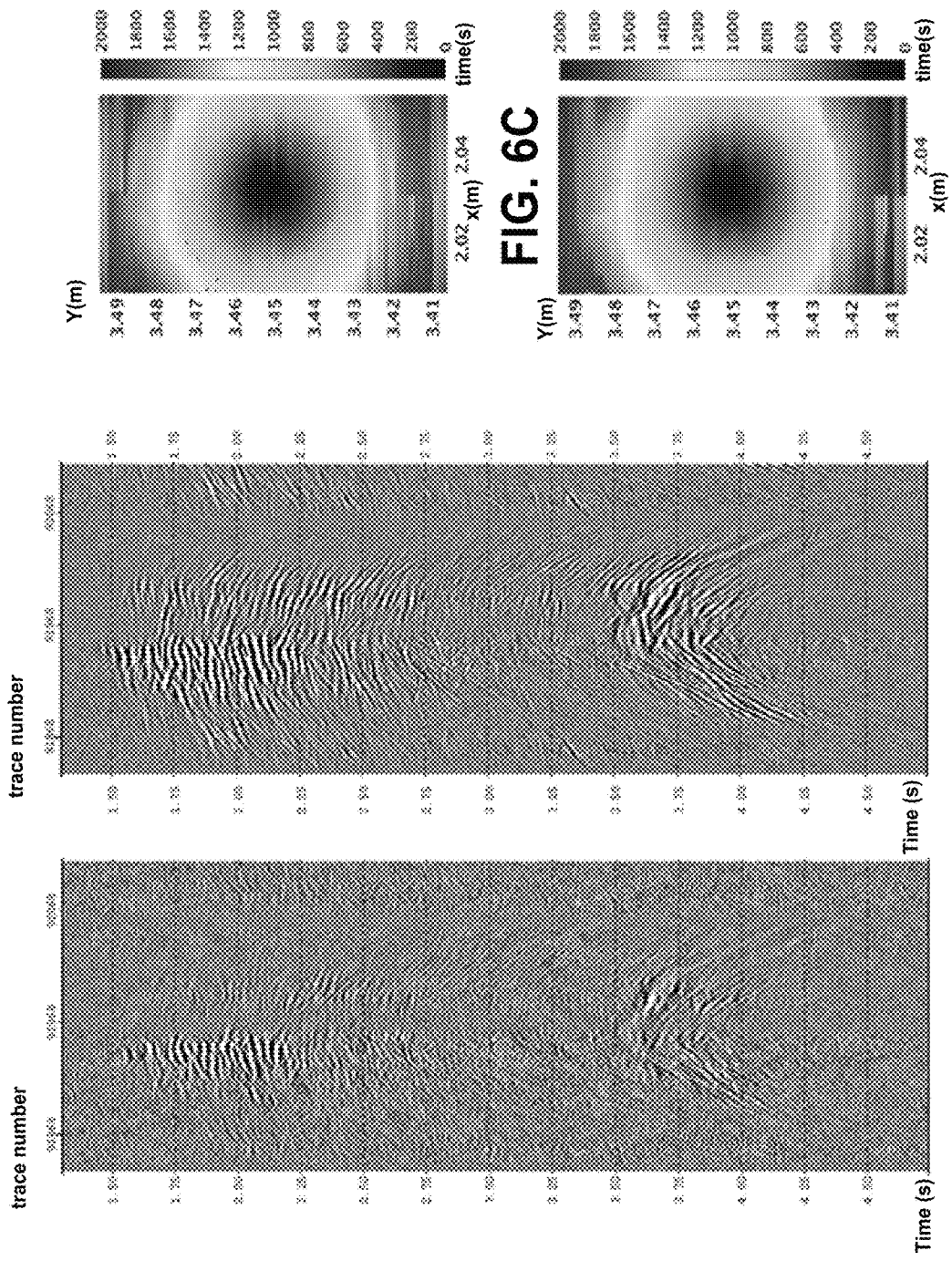

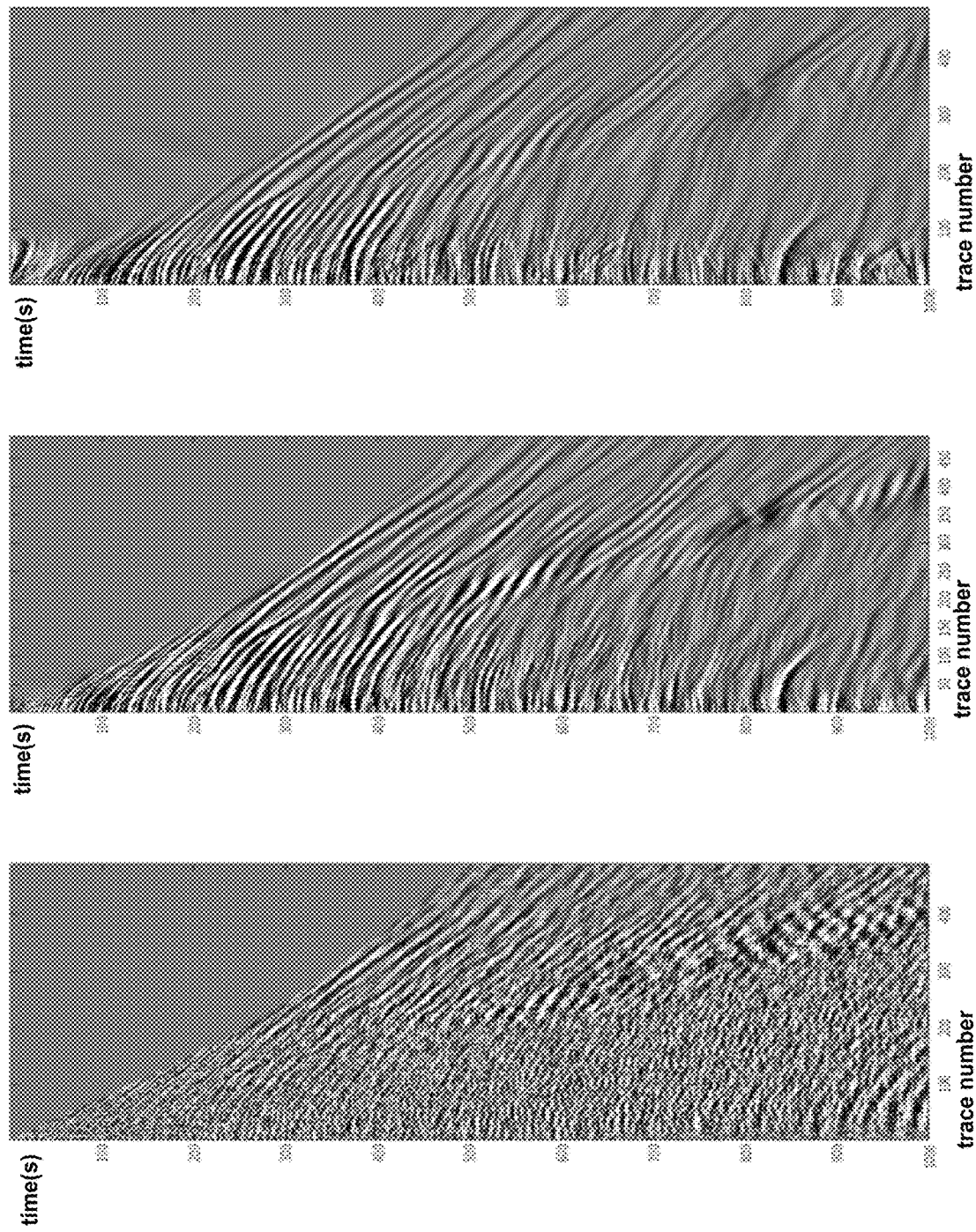

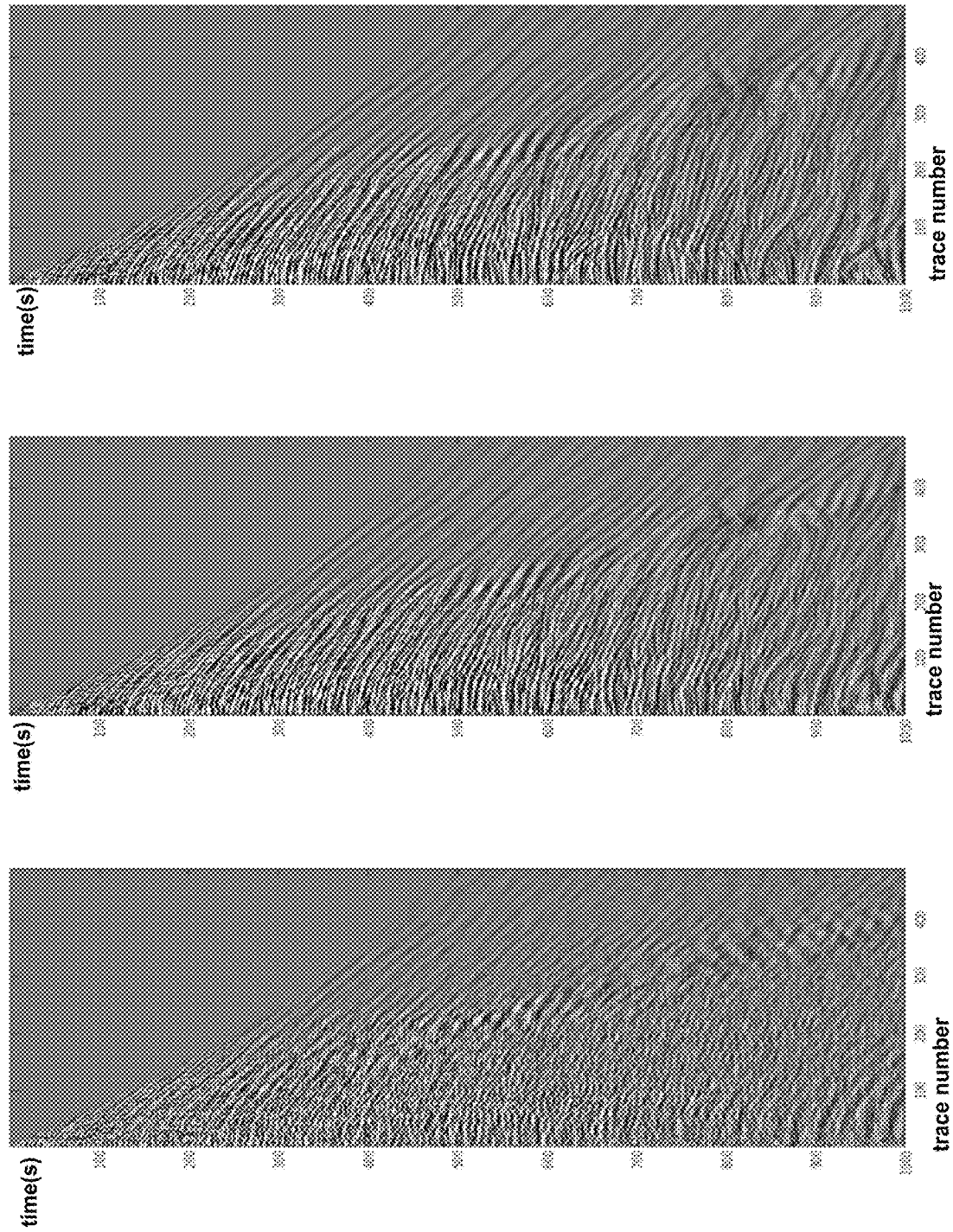

ENHANCEMENT OF SINGLE SENSOR SEISMIC DATA

CROSS-REFERENCE TO RELATED APPLICATION(S)

This application is a U.S. National Phase Application under 35 U.S.C. § 371 and claims the benefit of priority to International Application Serial No. PCT/RU2020/000469, filed Sep. 7, 2020, the contents of which are hereby incorporated by reference.

TECHNICAL FIELD

This disclosure relates to exploration seismology and, more specifically, to seismic data processing.

BACKGROUND

Seismic data contains information about various geological features. Seismic data can be obtained from seismic surveys to image geological structures of a subterranean region. Poststack seismic data can include two-dimensional (2D) seismic slices or three-dimensional (3D) seismic volumes. On the other hand, prestack seismic data can have higher dimensions including source and receiver positions arranged in orthogonal directions. For example, a seismic data volume can be represented as a five-dimensional (5D) prestack seismic cube with the dimensions of two source coordinates, two receiver coordinates, and time.

SUMMARY

For various reasons, three-dimensional (3D) land seismic data acquisition has been moving away from sparse grids of large source/receiver arrays to arrays of denser grids that include smaller arrays or point-source, point-receiver systems. These arrays, also called modern arrays, use single sensors or small source and receiver arrays to acquire land seismic data with a high spatial trace density (also called modern land seismic data). However, such datasets are challenging to process due to their massive size and low signal-to-noise ratio (SNR), which is caused, for example, by scattered near surface noise. Due to the challenging nature of these datasets, prestack data enhancement becomes an important step in their processing.

This disclosure describes a prestack data enhancement algorithm for enhancing three-dimensional (3D) single sensor seismic data. The algorithm includes two primary processing blocks: (i) estimation of local kinematic parameters, and (ii) wavefield transformation. The first processing block involves estimating kinematic parameters that define a non-linear traveltime surface that will be used for stacking. In one example, the kinematic parameters are first estimated on a sparse estimation grid (that is, compared to the original acquisition grid), and are then interpolated from the sparse estimation grid to a more dense estimation grid. The second processing block involves two-level summation, operator-oriented stacking using the estimated kinematic parameters, and amplitude-phase correction of the 3D single sensor seismic data. The second processing block outputs enhanced 3D single sensor seismic data.

Aspects of the subject matter described in this specification may be embodied in methods that include the actions of: receiving prestack single sensor seismic data; representing traveltime moveout of the prestack single sensor seismic data locally as a second-order curve; calculating, using the prestack single sensor seismic data, local kinematic parameters that define the second-order curve; and performing, based in part on the local kinematic parameters, wavefield transformation on the single sensor seismic data to generate enhanced prestack single sensor seismic data.

The previously-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium. These and other embodiments may each optionally include one or more of the following features.

In some implementations, calculating, based on the prestack single sensor seismic data, the local kinematic parameters involves: estimating the local kinematic parameters on a sparse estimation grid, wherein the sparse estimation grid is less dense than an acquisition field grid of the prestack single sensor seismic data; and interpolating the estimated local kinematic parameters from the sparse estimation grid to a dense estimation grid.

In some implementations, estimating the local kinematic parameters on the sparse estimation grid involves scanning one or more trajectories along the sparse estimation grid to select a trajectory with a threshold coherency defined by a maximum value of a semblance function.

In some implementations, estimating the local kinematic parameters on the sparse estimation grid involves estimating, on the sparse estimation grid, first-order derivatives of the second-order curve; and fixing the first-order derivatives and estimating, on the sparse estimation grid, second-order derivatives of the second-order curve.

In some implementations, performing, based in part on the local kinematic parameters, wavefield transformation on the prestack single sensor seismic data involves performing group data summation of the prestack single sensor seismic data from an acquisition field grid to a sparse data grid, wherein the sparse data grid is based on the acquisition field grid; and performing, using the estimated kinematic parameters, operator summation of the grouped data from the sparse data grid to the acquisition field grid, thereby generating the enhanced data on the acquisition field grid.

In some implementations, performing group data summation of the prestack single sensor seismic data from the acquisition field grid to the sparse data grid involves performing local super-grouping of the prestack single sensor seismic data to locally sum nearby traces in the prestack single sensor seismic data to generate locally summed data; and performing amplitude-phase correction on the locally summed data.

In some implementations, performing, using the estimated kinematic parameters, operator summation of the grouped data from the sparse grid to the acquisition field grid involves performing, on the sparse data grid, operator-oriented summation of the grouped data; and performing amplitude-phase correction on an output of the operator-oriented summation.

The subject matter described in this disclosure can be implemented to realize one or more of the following advantages. The disclosed prestack data enhancement workflow generates high-quality kinematic parameters at a reduced computational cost compared to existing solutions. In particular, the quality of the generated kinematic parameters is at least similar to or exceeds the quality of kinematic parameters generated using existing solutions that are more computationally expensive. Additionally, the disclosed workflow enhances seismic data to achieve an objectively high SNR at a reasonable computational cost. Specifically, not only is the quality of the enhanced seismic data achieved using the disclosed workflow at least similar to the quality of enhanced data achieved using existing solutions, but also the computational cost of the disclosed workflow is at least 10 times less than the computational cost of existing solutions. Furthermore, unlike existing solutions which lose high-frequency content when enhancing seismic data, the disclosed algorithm preserves the high-frequency content of the seismic data. Other advantages will be apparent to those of ordinary skill in the art.

The details of one or more implementations of the subject matter of this disclosure are set forth in the description, the claims, and the accompanying drawings. Other features, aspects, and advantages of the subject matter will become apparent from the description, the claims, and the accompanying drawings.

BRIEF DESCRIPTION OF THE DRAWINGS

FIGS. 4A, 4B, 4C illustrate a comparison between original data, enhanced data without parameter interpolation, and enhanced data with parameter interpolation, according to some implementations of the present disclosure.

FIGS. 6A, 6B, 6C, and 6D illustrate a comparison between a disclosed estimation strategy and an existing solution, according to some implementations of the present disclosure.

FIGS. 7A, 7B, 7C illustrate a comparison between an original gather, enhanced seismic data using conventional technology, and enhanced seismic data using a disclosed data enhancement approach without amplitude phase correction, according to some implementations of the present disclosure.

FIGS. 8A, 8B, 8C illustrate a comparison between an original gather, enhanced seismic data using conventional technology, and enhanced seismic data using a disclosed data enhancement approach with amplitude phase correction, according to some implementations of the present disclosure.

Like reference numbers and designations in the various drawings indicate like elements.

DETAILED DESCRIPTION

Figure 1:
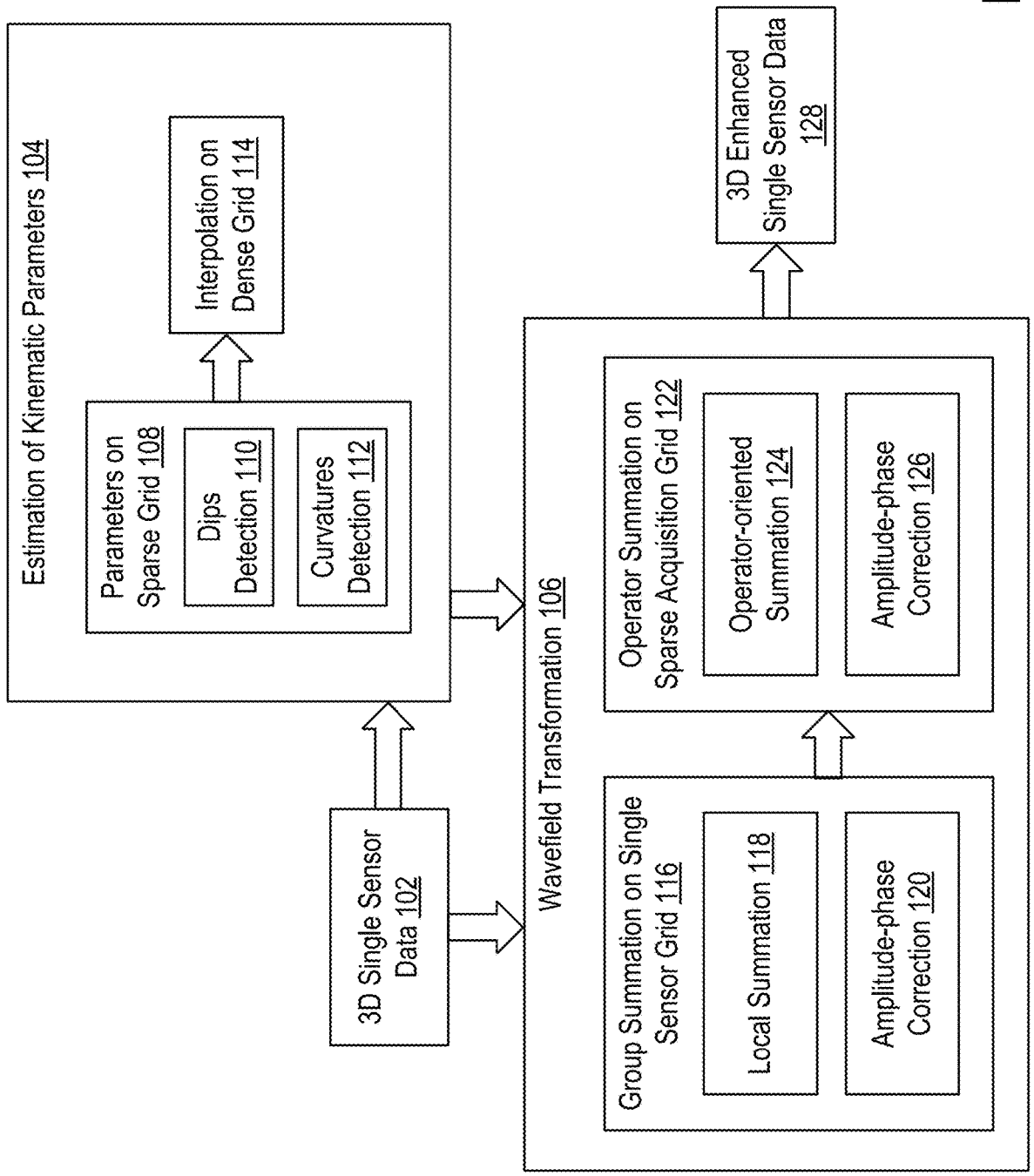
FIG. 1 illustrates a block diagram of a workflow for enhancing single sensor seismic data, according to some implementations of the present disclosure.

The following detailed description describes methods and systems for enhancing single sensor seismic data. Various modifications, alterations, and permutations of the disclosed implementations can be made and will be readily apparent to those of ordinary skill in the art. Further, the general principles defined may be applied to other implementations and applications, without departing from the scope of the disclosure. In some instances, details unnecessary to obtain an understanding of the described subject matter may be omitted so as to not obscure one or more described implementations with unnecessary detail since such details are within the skill of one of ordinary skill in the art. The present disclosure is not intended to be limited to the described or illustrated implementations. Furthermore, the present disclosure is to be accorded the widest scope consistent with the described principles and features. In this disclosure term "local" refers to seismic signals not globally, across a data gather, but locally in the neighborhood of each trace and time sample point.

I. Overview

Traditionally, three-dimensional (3D) land seismic data acquisitions have been performed with sparse grids of large field arrays that include a number of geophones on the order of high 10s to low 100s (for example, 72 geophones or more). These large field arrays with 5-10 meter (m) intra-array spacing were designed to attenuate strong noise caused by ground-roll and multiple scattering in the near-surface. Theoretically, denser data sampling and decreased array size should improve sampling of the noise wavefield, thereby facilitating its attenuation during the processing stage. In practice, however, high-density surveys with uniform and dense sampling in all directions remain prohibitively expensive with current sensor technology.

In recent practice, in order to overcome the limitations of large field arrays, orthogonal 3D surveys are acquired using small field arrays (that is, smaller than traditional field arrays) with smaller inline and much larger crossline spacing than traditional field arrays. The small field arrays include a number of geophones-per-channel on the order of low 10s or even in the single digits (for example, 15 geophones or less). These surveys have a high-channel count. For example, some high-channel count surveys have a trace density of around 15 million traces/kilometer$^2$ (traces/km$^2$). More dense point-receiver surveys acquired with 50,000-100,000 active channels can reach 100 million traces/km$^2$ and more. This leads to better spatial sampling of the seismic wavefield and is expected to improve final images after processing.

However, using small arrays or single sensors results in massive datasets with low signal-to-noise (SNR) ratios that are challenging to process. Processing prestack data in these seismic datasets is particularly challenging because the signals (for example, reflections) are masked by noise. For example, it is challenging and unreliable to apply conventional time processing algorithms to the prestack data because the derived processing parameters are based on noise. Additionally, conventional processing techniques such as surface-consistent scaling and deconvolution, statics estimation, and velocity analysis, all require a threshold prestack SNR to be effective and deliver suboptimal results otherwise. This especially affects the quality of prestack inversion, which requires reliable and accurate prestack amplitudes in seismic gathers. In order to improve the reliability and utility of seismic datasets that are acquired by small field arrays, the noise in the prestack data needs to be suppressed and the prestack signals need to be enhanced.

Several existing enhancement procedures are used to enhance prestack data. Coherency-based data enhancement techniques, which are used in the post-stack domain, can be applied to improve the signal level in prestack data, particularly in pre-migrated and post-migrated domains. The primary techniques from this category are based on local slant stacking of the prestack data and selection of the most coherent components. More advanced approaches, which are primarily based on common-reflection surface (CRS) and multifocusing theory, utilize second-order approximations of the wavefront to better describe kinematic parameters of the events and to stack locally along the events to increase SNR. In these approaches, moveout can be described using either a global or local operator. Methods that use the latter operator appear more flexible for enhancing challenging 3D land data where static issues often invalidate any global moveout behavior. That said, these methods rely on intensive numerical search for optimal coherency over an entire five-dimensional (5D) prestack data domain, making them computationally expensive.

This disclosure describes methods and systems for enhancing prestack single sensor seismic data at a reasonable computation cost. In some implementations, a prestack data enhancement workflow is used to enhance the prestack single sensor data. The workflow is decomposed into two primary processing blocks: (i) estimation of local kinematic parameters, which involves sequential estimation of dips and curvatures of a nonlinear traveltime surface on a sparse estimation grid, and subsequent interpolation of the estimated parameters to a dense estimation grid; and (ii) wavefield transformation, which involves fast two-level summation, operator-oriented stacking, and amplitude-phase correction of the prestack data to enhance the data. This workflow can be applied to modern 3D land datasets with large datasets (for example, on the order of hundreds of terabytes or even a petabyte). As described in this disclosure, the following steps allow the workflow to be efficiently implemented with large datasets: sequential estimation of kinematic parameters on a sparse estimation grid, interpolation of the estimated kinematic parameters to a dense estimation grid, group data summation of the data to a sparse grid, operator-oriented summation from the sparse grid to a dense original data grid, and amplitude-phase correction of the summed data.

Thereafter, other additional data enhancement such as deconvolution, followed by stacking and migration can be performed such that the final processed results are displayed for visualization. The disclosed embodiments may advantageously operate without the classical assumptions about hyperbolicity of seismic events. However, such embodiments may use the available stacking velocity as a guide to enhance primary reflections and to suppress other unwanted events such as multiples. Feasibility studies demonstratively show promising results from real data. Indeed, various implementations are fully conducive for modern reflection seismic data acquired with high-channel count. As such, these embodiments can advantageously make full use modern signal-sensor data that are densely sampled and voluminous in nature.

II. Methods and Systems for Enhancing Single Sensor Seismic Data

FIG. 1 illustrates a block diagram of a workflow for enhancing single sensor seismic data, according to some implementations. The workflow 100 is a multi-dimensional stacking based workflow that is designed for modern land seismic data. As shown in FIG. 1, the workflow 100 is decomposed into two processing blocks: estimation of local kinematic parameters block 104 and wavefield transformation block 106. In these processing blocks, the workflow 100 utilizes a second-order approximation of the wavefront to describe kinematic parameters of the seismic events in the seismic data and to stack locally along the estimated trajectories in order to increase SNR of the data. More specifically, and as described later on, in the estimation of local kinematic parameters block 104, a traveltime surface is represented locally as a general second-order curve and the kinematic parameters of the second-order curve are estimated. And in wavefield transformation block 106, multi-dimensional local summation along the estimated trajectories is performed to produce an output dataset with increased SNR.

The workflow 100 starts at step 102 of receiving 3D single sensor seismic data. The 3D single sensor seismic data is generated using a seismic survey (for example, seismic survey 900 of FIG. 9) performed by small arrays or single sensors. In some examples, the seismic data volume can be represented as a 5D cube with the dimensions of two source coordinates, two receiver coordinates (at the surface), and time.

The workflow 100 then moves to the first processing block 104. The first step in multi-dimensional stacking is to estimate the kinematic parameters, which locally describe traveltimes. Specifically, the workflow 100 describes traveltime moveout locally as a second-order surface. Considering a data space with a coordinate vector $\vec{x}=(x_s, y_s, x_r, y_r)$ defined by source and receiver x, y coordinates, the traveltime, t, can be locally represented using a Taylor series expansion. The Taylor series expansion includes fourteen unknown coefficients (that is, kinematic parameters) that define the local traveltime surface at a sample.

From a computational standpoint, estimating all fourteen kinematic parameters is too costly. In order to decrease the processing complexity, in one example, two arbitrary directions in the data space are fixed. Then, sections of the traveltime surface are evaluated only along the two other directions. Doing so reduces the number of unknown kinematic parameters from fourteen to five. These five unknown local kinematic parameters (two first order and three second order traveltime derivatives) are estimated in order to define the local traveltime surface at a sample. For example, the receiver coordinates in a cross-line direction and source coordinates in an inline direction are fixed, which provides a 3D section of the original 5D data volume and reduces the number of unknown kinematic parameters.

In an embodiment, the local kinematic parameters are estimated by scanning, on an estimation grid, different trajectories in order to determine a trajectory that has a threshold coherency defined by a maximum value of a semblance function. The semblance function measures the degree of similarity to each of the traces along the selected trajectory within a defined window. In an example, a sequential strategy is used to scan the different trajectories. In the sequential strategy, estimation of the first-order derivatives (that is, two kinematic parameters) is performed first. Then, these two parameters are fixed, and estimation of second-order derivatives (that is, three kinematic parameters) is performed. This sequential strategy is also referred to as a "Dips+Curvatures" strategy. From a computational perspective, this strategy is more computationally efficient than a full 5D search (for example, estimating the parameters at each trace of the 5D data volume). Additionally, this strategy provides better quality data than other existing hybrid solutions.

In one embodiment, to further improve performance of the workflow 100, the kinematic parameters are estimated on a sparse estimation grid (that is, compared to the original estimation grid), and are then interpolated to the original estimation grid (also referred to as a dense estimation grid). In an example, linear interpolation is used to interpolate the parameters from the sparse estimation grid to the dense estimation grid. In linear interpolation, the ratio between the grid steps of the new coarser grid and the originally chosen estimation grid is defined as $K_{int}^x$ (assuming that the same steps are used in both spatial dimensions). Also, instead of estimating parameters at every time sample, a coarser time grid with a ratio of $K_{int}^x$ with respect to the sampling can be used. In one example, a half-window size is used for a grid step in the time direction. Here, the half-window size is a good candidate since the semblance during the coherency search is calculated in a certain time window. The adequacy of this window size selection is shown by the real data examples described below in Section III.

These described steps of the local kinematic parameters block 104 are shown in FIG. 1. At step 108, the kinematic parameters are estimated on a sparse grid using a sequential strategy of dips detection 110 and curves detection 112. Dips detection 110 involves estimating the first-order derivatives (that is, two kinematic parameters) on the sparse estimation grid. And curves detection 112 involves fixing the first-order derivatives and estimating the second-order derivatives (that is, three kinematic parameters). In particular, estimating the kinematic parameters involves by scanning one or more trajectories in order to determine a trajectory that has a threshold coherency defined by a maximum value of a semblance function. Then, at step 114, the estimated kinematic parameters are interpolated from the sparse grid to a dense grid, perhaps using linear interpolation.

The workflow 100 then moves to the second processing block 106 of wavefield transformation. In this processing block 106, multi-dimensional local summation along the estimated trajectories is performed to produce an output dataset with increased SNR. However, as described above, for high-density seismic data, the number of traces within a typical enhancement aperture is significant. Therefore, the total number of operations in a direct application of conventional operator-oriented stacking is computationally prohibitive.

In an embodiment, to improve computational performance, the processing block 106 uses a two-level summation scheme. In this scheme, the dense single sensor seismic data is upscaled to an intermediate level with less trace density, followed by a second level of summation with operator-oriented stacking, which is much less computationally intensive than existing solutions. Although no data is discarded, the hierarchical two-level summation achieves a similar data enhancement effect at a significantly reduced computational cost compared to existing solutions.

Figure 2:
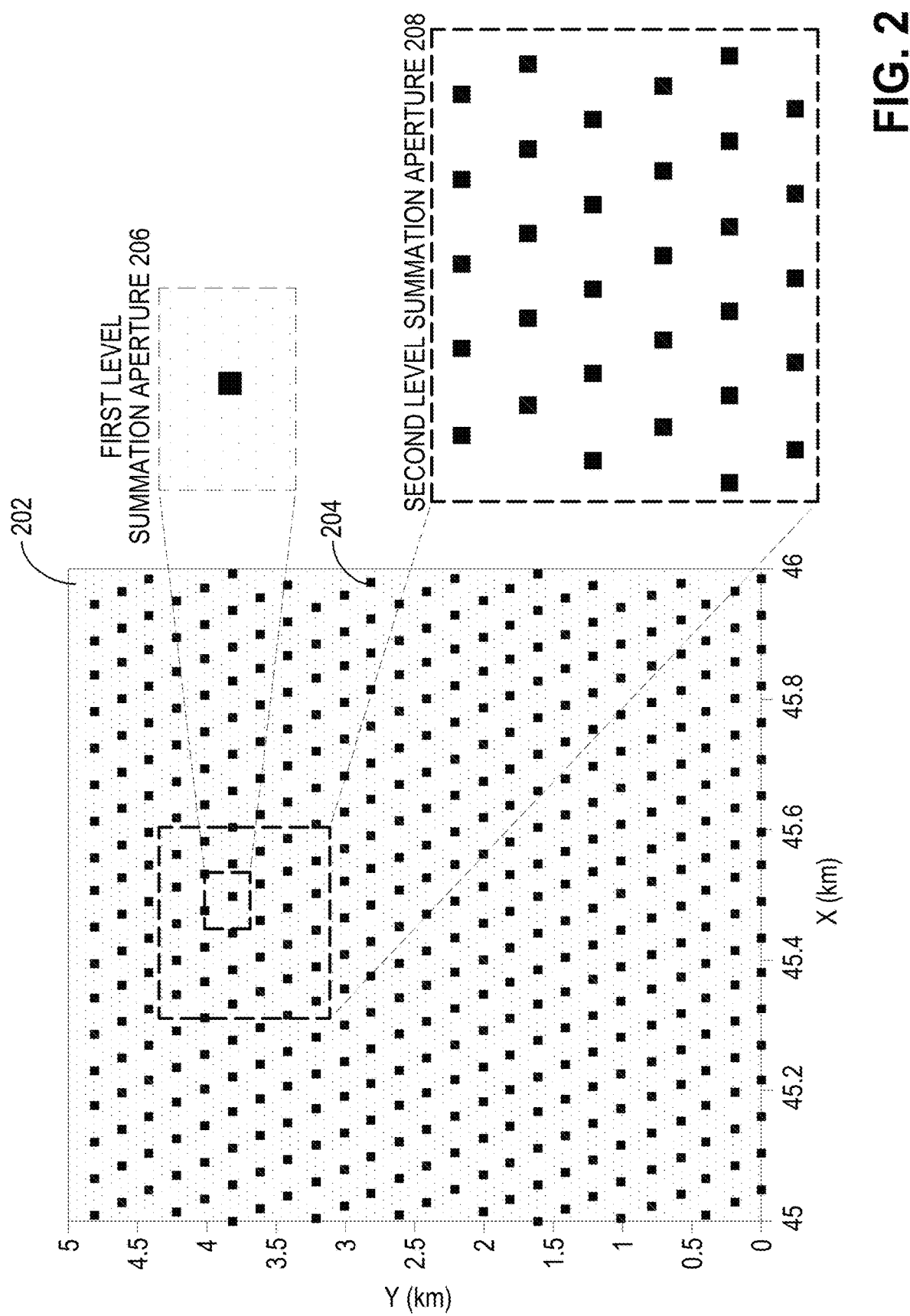
FIG. 2 illustrates an acquisition geometry of an intermediate dataset overlaying an original single sensor geometry, according to some implementations of the present disclosure.

In an embodiment, the first level summation involves sub-summation of original dense single sensor data to an intermediate less dense dataset. An artificial acquisition geometry, which has the same distribution function as the original acquisition geometry, is generated, but the number of traces is reduced significantly (for example, on the order of 10 times). Roughly, the new sparse acquisition geometry is generated as a subset of the original acquisition geometry (for example, as shown in FIG. 2). After the sparse grid is generated, an intermediate dataset is generated, where the intermediate dataset corresponds to the sparse grid via grouping of the original data within small apertures. This reduces the final cost of the operator-oriented stacking (performed in the next step) by a factor of approximately 10.

When performing the sub-summation, there are several approaches for grouping the original single sensor data. A first approach involves alternating projections onto convex sets in order to provide digital grouping (which is better than field analog grouping). The imposition of spectral constraints provides a key element in such digital grouping. This provides better results than analog receiver arrays, including better statics solutions. A second approach involves a super-grouping algorithm, which involves local summation of nearby traces. In particular, this algorithm is based on local summation within small apertures, and can be used for after a normal moveout (NMO) transform. The algorithm's modification and application to the initial seismic data allows correction for intra-array statics and residual phase variations, thereby leading to the preservation of higher frequencies and the ability to robustly estimate local time processing parameters from the enhanced data. A third approach involves local super-grouping as a primary step. And, in order to avoid loss of high-frequency content, amplitude phase correction (described below) is used as a secondary step.

After obtaining the data on the sparse grid, an optimal stacking method called an "operator-oriented method" is applied. Here, the "operator" defines a traveltime surface along which the local moveout correction is performed. In this method, the estimated kinematic parameters (from the first processing block 104) are stored at samples of sparse parameter traces that are located at the decimated uniform grid in the data space. These parameters define estimated traveltime trajectories spread around the neighborhood (that is, within the intermediate aperture). In this approach the signal is first accumulated in the traces where the parameters were estimated, and only then is moved to the target output traces. Thus, the parameters are used to perform local summation for each of the actual data traces. Note that the coarser the spatial grid of the parameter traces, the quicker the algorithm performs. That said, a too coarse grid may reduce the accuracy of the estimated moveouts, which reduces the quality of the enhanced data traces located far from the operator or parameter traces.

The output of the operator-oriented method generates an enhanced seismic data. However, when applying the operator-oriented method to the seismic data, the data may lose high-frequency content, which may decrease the utility of the data.

In an embodiment, amplitude phase correction is used to maintain the frequency content in the seismic data. The amplitude phase correction step can be inserted in two places-after the first level summation and after the second level summation. The amplitude phase correction uses phase spectra of locally stacked traces obtained during data enhancement in combination with the amplitude spectra of original traces that are unaffected by stacking. Since seismic signals are non-stationary, the time-domain signal (seismic trace) is first decomposed into the time-frequency domain by discrete short-time Fourier transform (STFT). After that, amplitude and phase spectra coupling is performed. The modified seismic trace is then synthesized by an inverse discrete short-time Fourier transform (ISTFT).

In one example, the amplitude-phase correction constructs a time-frequency (TF) spectrum of an output trace by combining the amplitude spectrum of an original trace with the phase spectrum of a corresponding enhanced trace. In another example, the amplitude-phase correction uses a Time-Frequency Mask (TFM) for signal and noise separation when generating an output dataset. In yet another example, the amplitude-phase correction involves estimating the actual noise component in the original traces. The estimate of the actual noise component is used to generate a TFM that is then used to construct an output trace.

The described steps of the wavefield transformation block 106 are shown in FIG. 1. As shown in FIG. 1, the wavefield transformation block 106 receives as input the 3D single sensor data and the estimated kinematic parameters generated by the estimation of kinematic parameters block 104. At step 116, group summation (that is, the first level summation) on the original single sensor grid is performed. Specifically, the group summation involves local summation of the original dense single sensor data to an intermediate dataset at step 118, perhaps using one of the three described approaches for grouping the original single sensor data. Then, amplitude-phase correction of the intermediate less dense dataset is performed at step 120. At step 122, operator summation is performed on the amplitude-phase corrected intermediate dataset. Specifically, the operator summation involves performing operator-oriented summation at 124, and amplitude-phase correction of the output dataset of the operator-oriented summation at step 126. The amplitude-phase corrected output dataset is then provided as the 3D enhanced single sensor data at step 128.

FIG. 2 illustrates an acquisition geometry of an intermediate dataset overlaying an original single sensor geometry, according to some implementations. As shown in FIG. 2, an original single sensor array is represented by dots, such as dot 202, and an intermediate dataset is represented by squares, such as square 204. Additionally, FIG. 2 illustrates a first level summation aperture 202 that is used for local summation 118, and a second level summation aperture 204 that is used for operator-oriented summation 124.

Figure 3:
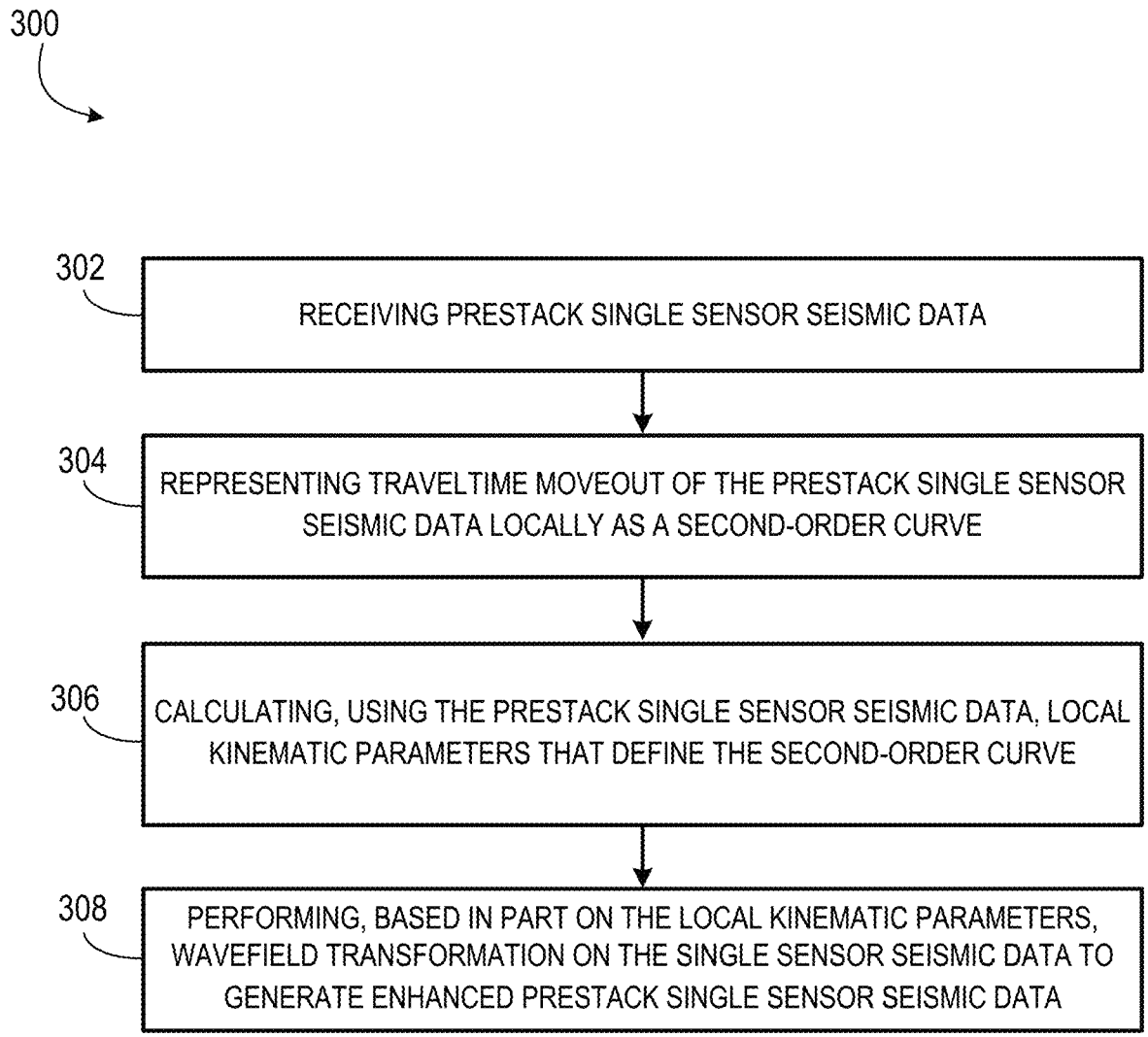
FIG. 3 illustrates a flowchart of an example method, according to some implementations of the present disclosure.

FIG. 3 is a flowchart of an example method 300 for enhancing single sensor seismic data. For clarity of presentation, the description that follows generally describes method 300 in the context of the other figures in this description. However, it will be understood that method 300 can be performed by any suitable system, environment, software, and hardware, or a combination of systems, environments, software, and hardware as appropriate. For example, the computer system 1000 can be used to implement the method 300. In some implementations, various steps of method 300 can be run in parallel, in combination, in loops, or in any order.

At step 302, the method 300 involves receiving prestack single sensor seismic data. In an example, the prestack single sensor seismic data is 3D single sensor seismic data. The 3D single sensor seismic data can be generated using a seismic survey (for example, seismic survey 900 of FIG. 9) performed by small arrays or single sensors. In some examples, the seismic data volume can be represented as a 5D cube with the dimensions of two source coordinates, two receiver coordinates (at the surface), and time.

At step 304, the method 300 involves representing traveltime moveout of the prestack single sensor seismic data locally as a second-order curve. In an example, considering a data space with a coordinate vector $\vec{x}=(x_s, y_s, x_r, y_r)$ defined by source and receiver x, y coordinates, the traveltime, t, can be locally represented using a Taylor series expansion. The Taylor series expansion includes fourteen unknown coefficients (that is, kinematic parameters) that define the local traveltime surface at a sample. In order to decrease the processing complexity, two arbitrary directions in the data space can be fixed. Then, sections of the traveltime surface are evaluated only along the two other directions. Doing so reduces the number of unknown kinematic parameters from fourteen to five. These five unknown local kinematic parameters (two first order and three second order traveltime derivatives) are estimated in order to define the local traveltime surface at a sample as a second-order curve.

At step 306, the method 300 involves calculating, using the prestack single sensor seismic data, local kinematic parameters that define the second-order curve. In an example, the local kinematic parameters are calculated using the steps of the estimation of local kinematic parameters block 104 of FIG. 1.

At step 308, the method 300 involves performing, based in part on the local kinematic parameters, wavefield transformation on the single sensor seismic data to generate enhanced prestack single sensor seismic data. In an example, the local kinematic parameters are calculated using the steps of the estimation of wavefield transformation block 106 of FIG. 1.

In some implementations, calculating, based on the prestack single sensor seismic data, the local kinematic parameters involves: estimating the local kinematic parameters on a sparse estimation grid, wherein the sparse estimation grid is less dense than an acquisition field grid of the prestack single sensor seismic data; and interpolating the estimated local kinematic parameters from the sparse estimation grid to a dense estimation grid.

In some implementations, estimating the local kinematic parameters on the sparse estimation grid involves scanning one or more trajectories along the sparse estimation grid to select a trajectory with a threshold coherency defined by a maximum value of a semblance function.

In some implementations, estimating the local kinematic parameters on the sparse estimation grid involves estimating, on the sparse estimation grid, first-order derivatives of the second-order curve; and fixing the first-order derivatives and estimating, on the sparse estimation grid, second-order derivatives of the second-order curve.

In some implementations, performing, based in part on the local kinematic parameters, wavefield transformation on the prestack single sensor seismic data involves performing group data summation of the prestack single sensor seismic data from an acquisition field grid to a sparse data grid, wherein the sparse data grid is based on the acquisition field grid; and performing, using the estimated kinematic parameters, operator summation of the grouped data from the sparse data grid to the acquisition field grid, thereby generating the enhanced data on the acquisition field grid.

In some implementations, performing group data summation of the prestack single sensor seismic data from the acquisition field grid to the sparse data grid involves performing local super-grouping of the prestack single sensor seismic data to locally sum nearby traces in the prestack single sensor seismic data to generate locally summed data; and performing amplitude-phase correction on the locally summed data.

In some implementations, performing, using the estimated kinematic parameters, operator summation of the grouped data from the sparse grid to the acquisition field grid involves performing, on the sparse data grid, operator-oriented summation of the grouped data; and performing amplitude-phase correction on an output of the operator-oriented summation.

The example method 300 shown in FIG. 3 can be modified or reconfigured to include additional, fewer, or different steps (not shown in FIG. 3), which can be performed in the order shown or in a different order.

As an example, the method 300 may also involve generating an image of the subsurface based on the enhanced prestack single sensor seismic data. Furthermore, in some implementations, the method 300 involves displaying, on a display device, the image of the subsurface on a display device, thereby displaying an image of the subsurface not otherwise achievable using the same seismic data. Yet further, in some implementations, the method 300 involves performing drilling actions based on the enhanced prestack single sensor seismic data (or the subsurface image generated based on the enhanced prestack single sensor seismic data). For example, the method 300 may involve identifying one or more areas for drilling in the subsurface. Furthermore, the method 300 may involve controlling one or more drilling tools (for example, a drill string or drill bit) to drill a wellbore in the one or more areas.

III. Real Data Examples

The section demonstrates the efficiency of the disclosed workflow. First, FIGS. 4A-4C, 5A-5D, and 6A-6D illustrate the results of using kinematic parameters interpolation, according to some implementations.

FIGS. 4A, 4B, 4C illustrate a comparison between original data, enhanced data without parameter interpolation, and enhanced data with parameter interpolation. In particular, FIG. 4A illustrates original data, FIG. 4B illustrates enhanced data without parameter interpolation ($K_{int}^x=1$), and FIG. 4C illustrates enhanced data with interpolation where the estimation of parameters is performed at every second spatial point followed by parameter interpolation ($K_{int}^x=2$).

Figure 5B:
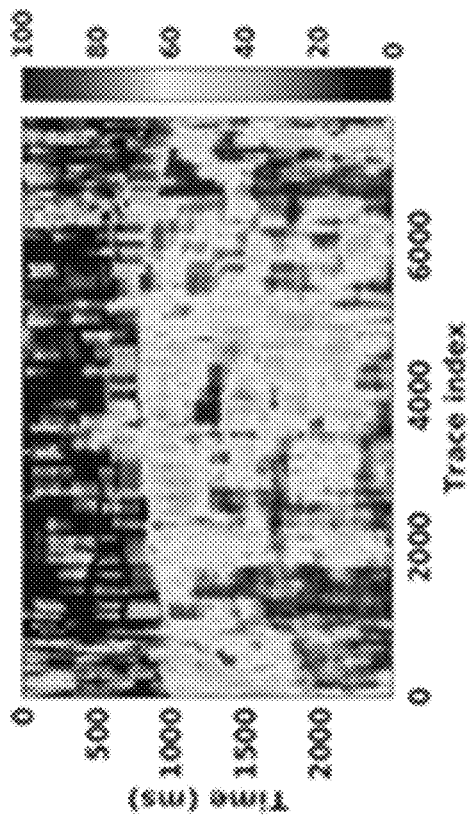
FIGS. 5A, 5B, 5C, and 5D illustrate Normalized Root Mean Square (NRMS) values that quantify repeatability or similarity between reference dataset enhanced using original dense grid and other versions of enhanced data obtained using different interpolation approaches, according to some implementations of the present disclosure.
Figure 5D:
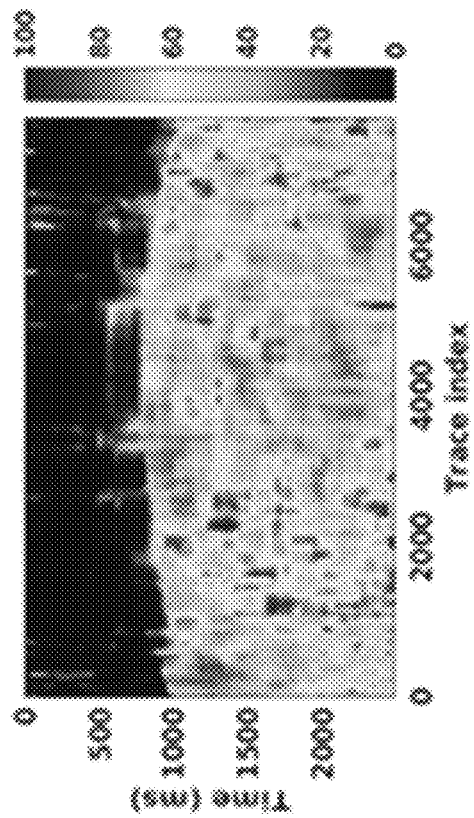
Figure 5A:
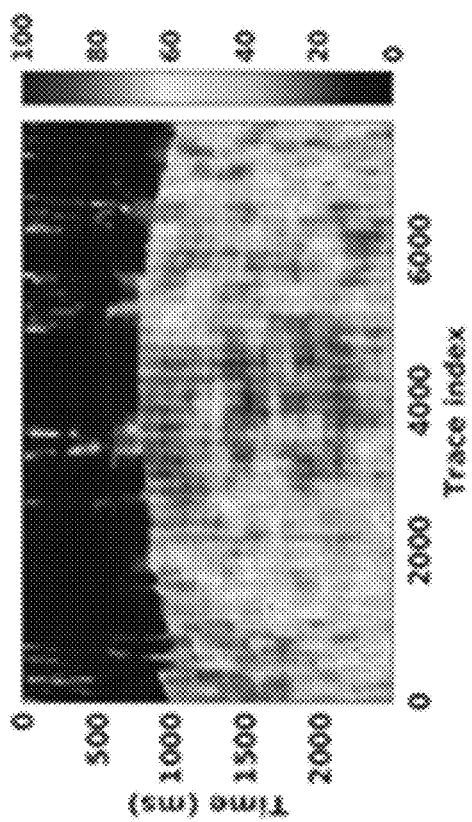
Figure 5C:
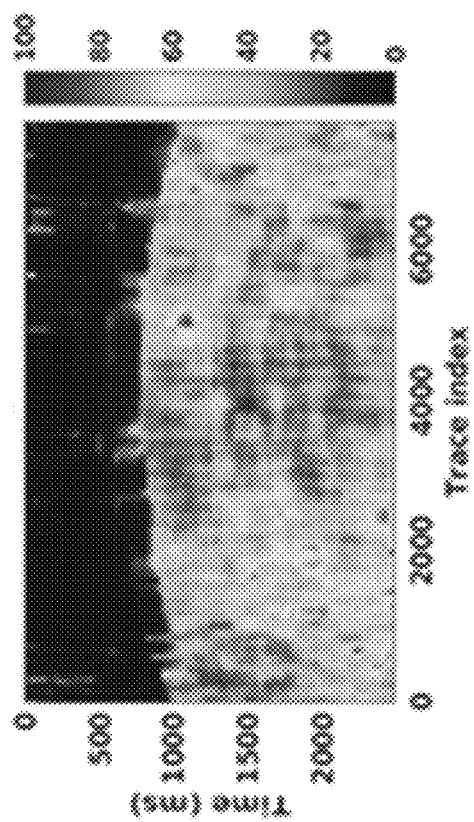

FIGS. 5A, 5B, 5C, and 5D illustrate Normalized Root Mean Square (NRMS) values that quantify repeatability or similarity between reference dataset enhanced using an original dense grid and other versions of enhanced data obtained using different interpolation approaches. FIG. 5A illustrates NRMS values for $K_{int}^x=2$, $K_{int}^t=1$; FIG. 5B illustrates NRMS values for $K_{int}^x=1$, $K_{int}^t=1$; FIG. 5C illustrates NRMS values for $K_{int}^x=1$, $K_{int}^t=11$; and FIG. 5D illustrates NRMS values for $K_{int}^x=1$, $K_{int}^t=32$. Average NMRS values are 27% for FIG. 5A, 51% for FIG. 5B, 30% for FIG. 5C, and 36% for FIG. 5D with smaller values indicating closer resemblance to reference dataset. Note that NRMS≤30% is considered as an acceptable range here.

FIGS. 6A, 6B, 6C, and 6D illustrate a comparison between the disclosed estimation strategy and an existing solution. In particular, FIGS. 6A-6D compare picked travel times of the two approaches. FIG. 6A illustrates enhanced seismic data and FIG. 6C illustrates picked travel times on that data using an existing solution. FIG. 6B illustrates enhanced seismic data and FIG. 6D illustrates first-break picked travel times on that data using the "Dips+Curvatures" estimation strategy.

FIGS. 4A, 4B, 4C show a comparison between the originally enhanced data ($K_{int}^x=1$) and the data, where the estimation of parameters was performed every second spatial point followed by parameter interpolation ($K_{int}^x=2$). The achieved speedup in the second case is four times (due to 2D estimation grid), while the enhancement results are comparable (as shown in FIG. 5A). Note that performing summation at this coarser grid without additional parameter interpolation, significantly deteriorates the results (as shown in FIG. 4B). NRMS metric typical for 4D seismic monitoring is used to evaluate the quality or closeness of the data enhanced with the brute-force conventional approach and the disclosed optimized approach. NRMS values (shown in FIG. 5C) obtained with such a step ($K_{int}^x=11$ in this case) are comparable to the previous spatial interpolation results with $K_{int}^x=2$. In the current example, additional performance speedup is a factor of four. Increasing $K_{est}^t$ beyond 11 (half-window size) produces data with larger NRMS values indicating unacceptable deviation from a reference dataset without the use of interpolation (as shown in FIG. 5D).

Then usage of interpolation together with "Dips+Curvature" strategy is compared with an existing solution and a full 5D strategy with global optimization (see Table 1). The "Dips+Curvatures" strategy with interpolation of kinematic parameters ($K_{int}^x=11$, $K_{int}^x=K_{int}^y=2$) provides the quality of the kinematic parameters similar to the best achievable quality when full 5D estimation is applied (similar average semblance values suggest achieving best possible coherency, see Table 1) while the performance is similar or better than the existing solution (similar computational times, see Table 1). Additionally, the quality of the data enhancement using "Dips+Curvatures" strategy with interpolation of kinematic parameters ($K_{int}^t=12$, $K_{int}^x=K_{int}^y=2$) is better than the quality of the data enhancement using existing solution in terms of recovered events and also in terms of first-break picking (as shown in FIGS. 6A-6D) while the required computational resources for estimation are about twice lower.

TABLE 1

|  | Existing Approach | 5D DIPS + CURVES | 5D FULL |
|---|---|---|---|
| ESTIMATION TIME | 687 s | 725 s | ~6000000 s |
| SUMMATION TIME | 102 s | 104 s | ~105 s |
| TOTAL TIME | 789 s | 829 s | ~6000105 s |
| Quality metric 1: Semblance Average | 0.011 | 0.020 | 0.025 |
| Quality metric 2: NRMS | 40% | 35% | Reference |

FIGS. 7A-7C and FIGS. 8A-8C illustrate results of numerical experiments from a 2D single-sensor profile in the CDP/Offset domain, according to some implementations.

FIGS. 7A, 7B, 7C illustrate a comparison between an original gather, enhanced seismic data using conventional technology, and the disclosed data enhancement approach without amplitude phase correction.

FIGS. 8A, 8B, 8C illustrate a comparison between an original gather, amplitude phase correction applied to the original gather using phase information from the conventional technology, and the disclosed data enhancement approach with amplitude phase correction.

The gather consists of 100, 500 seismic traces with 4 ms time sampling and record time 4 s (1000 samples). The dimension of the intermediate dataset is 10,000 traces obtained via a grouping of original data with apertures: aper_x=11 m and aper_y=55 m. The results of the conventional technology and the disclosed approach without amplitude phase correction are presented in FIGS. 7A-7C. The modified summation utilizing intermediate supergrouping of original data took 363 s versus 5962 s of conventional technology. So the overall speedup of summation is about 17 fold. FIGS. 8A-8C illustrate application of amplitude phase correction to the original dataset, using phase information from the conventional technology and super-grouping.

IV. Example Seismic Survey

Figure 9:
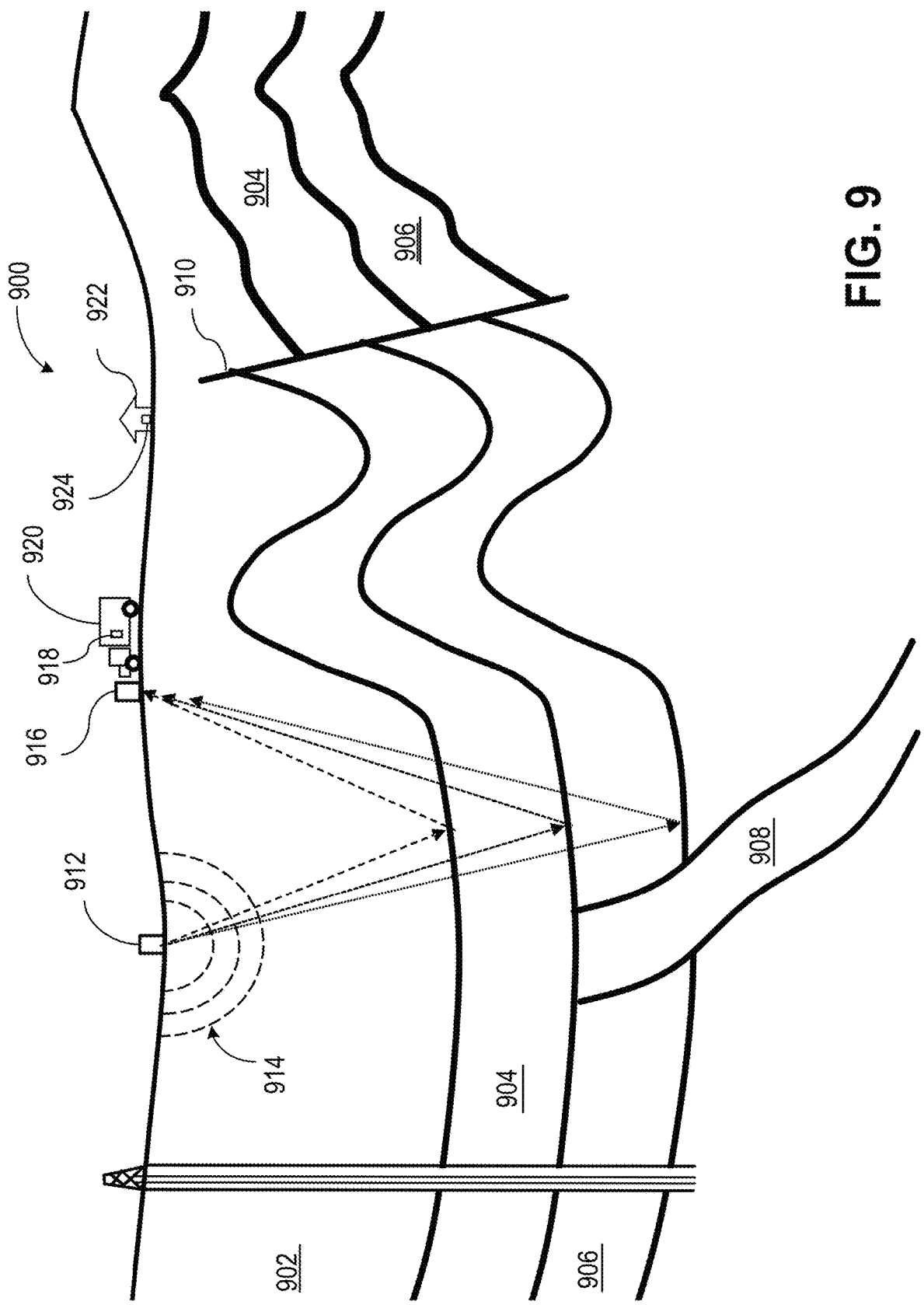
FIG. 9 illustrates a schematic view of a seismic survey being performed to map subterranean features such as facies and faults in a subterranean formation

FIG. 9 is a schematic view of a seismic survey being performed to map subterranean features such as facies and faults in a subterranean formation 900. The subterranean formation 900 includes a layer of impermeable cap rocks 902 at the surface. Facies underlying the impermeable cap rocks 902 include a sandstone layer 904, a limestone layer 906, and a sand layer 908. A fault line 910 extends across the sandstone layer 904 and the limestone layer 906.

A seismic source 912 (for example, a seismic vibrator or an explosion) generates seismic waves 914 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 900, the velocity of seismic waves traveling through the subterranean formation 900 will be different in the sandstone layer 904, the limestone layer 906, and the sand layer 908. As the seismic waves 914 contact interfaces between geologic bodies or layers that have different velocities, the interface reflects some of the energy of the seismic wave and refracts part of the energy of the seismic wave. Such interfaces are sometimes referred to as horizons.

The seismic waves 914 are received by a sensor or sensors 916. Although illustrated as a single component in FIG. 1, the sensor or sensors 916 are typically a line or an array of sensors 916 that generate an output signal in response to received seismic waves including waves reflected by the horizons in the subterranean formation 900. The sensor or sensors 916 can be geophone-receivers that produce electrical output signals transmitted as input data, for example, to a computer 918 on a seismic control truck 920. Based on the input data, the computer 918 may generate a seismic data output such as, for example, a seismic two-way response time plot.

A control center 922 can be operatively coupled to the seismic control truck 920 and other data acquisition and wellsite systems. The control center 922 may have computer facilities for receiving, storing, processing, and analyzing data from the seismic control truck 920 and other data acquisition and wellsite systems. For example, computer systems 924 in the control center 922 can be configured to analyze, model, control, optimize, or perform management tasks of field operations associated with development and production of resources such as oil and gas from the subterranean formation 900. Alternatively, the computer systems 924 can be located in a different location than the control center 922. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 924 may be displayed for user viewing using local or remote monitors or other display units. One approach to analyzing seismic data is to associate the data with portions of a seismic cube representing the subterranean formation 900. The seismic cube can also display results of the analysis of the seismic data associated with the seismic survey.

V. Example Computer System

Figure 10:
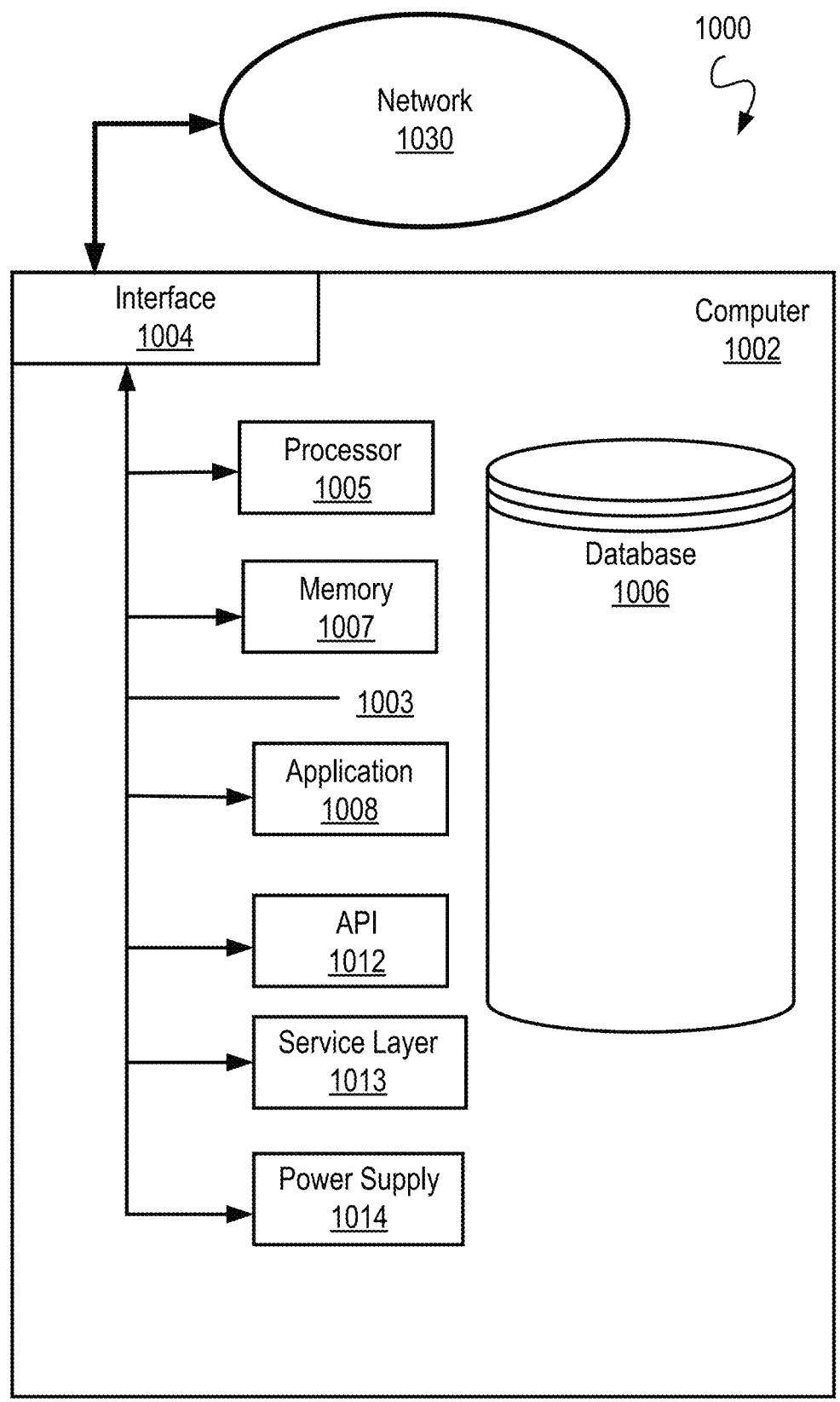
FIG. 10 illustrates a block diagram of an example computer system used to provide computational functionalities associated with described algorithms, methods, functions, processes, flows, and procedures, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030, or the interface's hardware, can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the powersupply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002, and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic disks, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tapes, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

We claim:

1. A method comprising:
   acquiring, using a seismic survey, prestack single sensor seismic data;
   representing traveltime moveout of the prestack single sensor seismic data locally as a second-order curve;
   calculating, using the prestack single sensor seismic data, local kinematic parameters that define the second-order curve, wherein calculating the local kinematic parameters comprises:
      estimating the local kinematic parameters on a sparse estimation grid less dense than an acquisition field grid of the prestack single sensor seismic data, wherein estimating the local kinematic parameters comprises scanning one or more trajectories along the sparse estimation grid to select a trajectory with a threshold coherency defined by a maximum value of a semblance function; and
      interpolating the estimated local kinematic parameters from the sparse estimation grid to a dense estimation grid; and
   performing, based in part on the local kinematic parameters, wavefield transformation on the single sensor seismic data to generate enhanced prestack single sensor seismic data.

2. The method of claim 1, wherein estimating the local kinematic parameters on the sparse estimation grid comprises:
   estimating, on the sparse estimation grid, first-order derivatives of the second-order curve; and
   fixing the first-order derivatives and estimating, on the sparse estimation grid, second-order derivatives of the second-order curve.

3. The method of claim 1, wherein performing, based in part on the local kinematic parameters, wavefield transformation on the prestack single sensor seismic data comprises:
   performing group data summation of the prestack single sensor seismic data from an acquisition field grid to a sparse data grid, wherein the sparse data grid is based on the acquisition field grid; and
   performing, using the estimated kinematic parameters, operator summation of the grouped data from the sparse data grid to the acquisition field grid, thereby generating the enhanced data on the acquisition field grid.

4. The method of claim 3, wherein performing group data summation of the prestack single sensor seismic data from the acquisition field grid to the sparse data grid comprises:
   performing local super-grouping of the prestack single sensor seismic data to locally sum nearby traces in the prestack single sensor seismic data to generate locally summed data; and
   performing amplitude-phase correction on the locally summed data.

5. The method of claim 3, wherein performing, using the estimated kinematic parameters, operator summation of the grouped data from the sparse grid to the acquisition field grid comprises:
   performing, on the sparse data grid, operator-oriented summation of the grouped data; and
   performing amplitude-phase correction on an output of the operator-oriented summation.

6. A non-transitory computer-readable medium storing one or more instructions executable by a computer system to perform operations comprising:
   acquiring, using a seismic survey, prestack single sensor seismic data;
   representing traveltime moveout of the prestack single sensor seismic data locally as a second-order curve;
   calculating, using the prestack single sensor seismic data, local kinematic parameters that define the second-order curve curve, wherein calculating the local kinematic parameters comprises:
      estimating the local kinematic parameters on a sparse estimation grid less dense than an acquisition field grid of the prestack single sensor seismic data, wherein estimating the local kinematic parameters comprises scanning one or more trajectories along the sparse estimation grid to select a trajectory with a threshold coherency defined by a maximum value of a semblance function; and
      interpolating the estimated local kinematic parameters from the sparse estimation grid to a dense estimation grid; and
   performing, based in part on the local kinematic parameters, wavefield transformation on the single sensor seismic data to generate enhanced prestack single sensor seismic data.

7. The non-transitory computer-readable medium of claim 6, wherein estimating the local kinematic parameters on the sparse estimation grid comprises:
   estimating, on the sparse estimation grid, first-order derivatives of the second-order curve; and
   fixing the first-order derivatives and estimating, on the sparse estimation grid, second-order derivatives of the second-order curve.

8. The non-transitory computer-readable medium of claim 6, wherein performing, based in part on the local kinematic parameters, wavefield transformation on the prestack single sensor seismic data comprises:
   performing group data summation of the prestack single sensor seismic data from an acquisition field grid to a sparse data grid, wherein the sparse data grid is based on the acquisition field grid; and
   performing, using the estimated kinematic parameters, operator summation of the grouped data from the sparse data grid to the acquisition field grid, thereby generating the enhanced data on the acquisition field grid.

9. The non-transitory computer-readable medium of claim 8, wherein performing group data summation of the prestack single sensor seismic data from the acquisition field grid to the sparse data grid comprises:
   performing local super-grouping of the prestack single sensor seismic data to locally sum nearby traces in the prestack single sensor seismic data to generate locally summed data; and
   performing amplitude-phase correction on the locally summed data.

10. The non-transitory computer-readable medium of claim 8, wherein performing, using the estimated kinematic parameters, operator summation of the grouped data from the sparse grid to the acquisition field grid comprises:
    performing, on the sparse data grid, operator-oriented summation of the grouped data; and
    performing amplitude-phase correction on an output of the operator-oriented summation.

11. A system, comprising:
    one or more processors; and
    a non-transitory computer-readable storage medium coupled to the one or more processors and storing programming instructions for execution by the one or more processors, the programming instructions instructing the one or more processors to perform operations comprising:
       acquiring, using a seismic survey, prestack single sensor seismic data;
       representing traveltime moveout of the prestack single sensor seismic data locally as a second-order curve;
       calculating, using the prestack single sensor seismic data, local kinematic parameters that define the second-order curve, wherein calculating the local kinematic parameters comprises:
          estimating the local kinematic parameters on a sparse estimation grid less dense than an acquisition field grid of the prestack single sensor seismic data, wherein estimating the local kinematic parameters comprises scanning one or more trajectories along the sparse estimation grid to select a trajectory with a threshold coherency defined by a maximum value of a semblance function; and
          interpolating the estimated local kinematic parameters from the sparse estimation grid to a dense estimation grid; and
       performing, based in part on the local kinematic parameters, wavefield transformation on the single sensor seismic data to generate enhanced prestack single sensor seismic data.

12. The system of claim 11, wherein estimating the local kinematic parameters on the sparse estimation grid comprises:
    estimating, on the sparse estimation grid, first-order derivatives of the second-order curve; and
    fixing the first-order derivatives and estimating, on the sparse estimation grid, second-order derivatives of the second-order curve.

13. The system of claim 11, wherein performing, based in part on the local kinematic parameters, wavefield transformation on the prestack single sensor seismic data comprises:
    performing group data summation of the prestack single sensor seismic data from an acquisition field grid to a sparse data grid, wherein the sparse data grid is based on the acquisition field grid; and
    performing, using the estimated kinematic parameters, operator summation of the grouped data from the sparse data grid to the acquisition field grid, thereby generating the enhanced data on the acquisition field grid.

14. The system of claim 13, wherein performing group data summation of the prestack single sensor seismic data from the acquisition field grid to the sparse data grid comprises:
  performing local super-grouping of the prestack single sensor seismic data to locally sum nearby traces in the prestack single sensor seismic data to generate locally summed data; and
  performing amplitude-phase correction on the locally summed data.

\* \* \* \* \*

UNITED STATES PATENT AND TRADEMARK OFFICE
CERTIFICATE OF CORRECTION

| | | |
|---|---|---|
| PATENT NO. | : 12,339,411 B2 | Page 1 of 1 |
| APPLICATION NO. | : 18/043648 | |
| DATED | : June 24, 2025 | |
| INVENTOR(S) | : Andrey Bakulin et al. | |

It is certified that error appears in the above-identified patent and that said Letters Patent is hereby corrected as shown below:

In the Claims

In Column 21, Line 30, Claim 6, please replace "curve curve," with -- curve, --

Signed and Sealed this
Fourteenth Day of October, 2025

John A. Squires
*Director of the United States Patent and Trademark Office*